United States Patent
Kuribara

(10) Patent No.: US 10,434,891 B2
(45) Date of Patent: Oct. 8, 2019

(54) MOTOR VEHICLE ELECTRICAL SYSTEM WITH SOLAR POWERED BATTERY CHARGING

(71) Applicant: TOYOTA JIDOSHA KABUSHIKI KAISHA, Toyota-shi, Aichi-ken (JP)

(72) Inventor: Fumiyoshi Kuribara, Toyota (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 294 days.

(21) Appl. No.: 15/671,205

(22) Filed: Aug. 8, 2017

(65) Prior Publication Data
US 2018/0043788 A1 Feb. 15, 2018

(30) Foreign Application Priority Data
Aug. 12, 2016 (JP) .................. 2016-158734

(51) Int. Cl.
*B60L 3/00* (2019.01)
*B60L 11/18* (2006.01)
(Continued)

(52) U.S. Cl.
CPC ......... *B60L 11/1868* (2013.01); *B60L 3/0046* (2013.01); *B60L 8/003* (2013.01); *B60L 58/20* (2019.02); *B60L 50/11* (2019.02); *B60L 50/61* (2019.02); *B60L 53/20* (2019.02); *B60L 2210/10* (2013.01); *B60L 2210/40* (2013.01); *B60L 2220/14* (2013.01); *B60L 2240/12* (2013.01); *Y02T 10/6217* (2013.01); *Y02T 10/646* (2013.01); *Y02T 10/7005* (2013.01); *Y02T 10/7066* (2013.01); *Y02T 10/7072* (2013.01); *Y02T 10/7077* (2013.01);
(Continued)

(58) Field of Classification Search
CPC ...... B60L 11/1868; B60L 58/20; B60L 53/20; B60L 8/003
USPC .................................................. 320/101, 104
See application file for complete search history.

(56) References Cited

U.S. PATENT DOCUMENTS 9,356,456 B2 \* 5/2016 Fukada .................. H02J 7/0052
10,052,967 B2 \* 8/2018 Saucke .................... B60L 58/12
(Continued)

FOREIGN PATENT DOCUMENTS

EP 2426024 B1 3/2015
JP 2010-141958 A 6/2010
(Continued)

*Primary Examiner* — Richard V Muralidar
(74) *Attorney, Agent, or Firm* — Oliff PLC

(57) ABSTRACT

A motor vehicle is configured to include a first battery; a second battery; a first converter configured to step-down an electric power of the first power line and supply the stepped-down electric power to a second power line with which the second battery is connected; a third battery; a solar charging device configured to generate electric power using sunlight and supply the generated electric power to the third battery; and a second converter configured to transmit electric power accompanied with a change in a voltage between the second power line and a third power line with which the third battery is connected. The motor vehicle of this configuration is configured to provide permission for relief charging that is charging of the third battery using an electric power on a first power line side, when a voltage of the second battery is not lower than a predetermined voltage.

6 Claims, 7 Drawing Sheets

(51) Int. Cl.
  *B60L 8/00*   (2006.01)
  *B60L 58/20*  (2019.01)
  *B60L 50/11*      (2019.01)
  *B60L 50/61*      (2019.01)
  *B60L 53/20*      (2019.01)

(52) U.S. Cl.
  CPC ........ *Y02T 10/7083* (2013.01); *Y02T 10/7094* (2013.01); *Y02T 10/7216* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 2009/0001926 A1* | 1/2009 | Sato | B60L 3/0046 320/102 |
| 2010/0244782 A1 | 9/2010 | Nagayama et al. | |
| 2011/0210694 A1* | 9/2011 | Uehashi | H02J 3/32 320/101 |
| 2013/0342154 A1* | 12/2013 | Yamamoto | H02J 7/007 320/101 |
| 2018/0105042 A1* | 4/2018 | Kuribara | B60L 50/50 |

FOREIGN PATENT DOCUMENTS

| | | |
|---|---|---|
| JP | 2010-206885 A | 9/2010 |
| JP | 2014-204549 A | 10/2014 |
| JP | 2015-057009 A | 3/2015 |
| JP | 2015-201995 A | 11/2015 |
| JP | 2016-052869 A | 4/2016 |

\* cited by examiner

MOTOR VEHICLE ELECTRICAL SYSTEM WITH SOLAR POWERED BATTERY CHARGING

This application claims priority to Japanese Patent Application No. 2016-158734 filed 12 Aug. 2016, the contents of which is incorporated herein by reference.

TECHNICAL FIELD

The present disclosure relates to a motor vehicle.

BACKGROUND ART

A proposed configuration of a prior art motor vehicle includes a main battery configured to supply electric power to a motor generator for driving, an auxiliary machine battery configured to supply electric power to an auxiliary machine load, a solar charging unit configured to generate electric power using sunlight, an auxiliary battery (solar battery) configured to accumulate the electric power generated by the solar charging unit, and a step-down DC-DC converter configured to step-down an electric power from the auxiliary battery and supply the stepped-down voltage to the auxiliary machine battery (as described in, for example, JP 2015-201995A). This motor vehicle is configured to control the step-down DC-DC converter such as to supply an electric power required for staring a system from the auxiliary battery to the auxiliary machine battery at the time of starting the system of the vehicle. This configuration improves the system startability of the vehicle.

SUMMARY

Technical Problem

When power generation by the solar charging unit is not sufficiently performed for a certain time period, for example, when the above motor vehicle is parked in an indoor parking space for a certain time period, self-discharge of the auxiliary battery decreases the voltage of the auxiliary battery to some extent and is likely to cause over-discharge of the auxiliary battery.

The motor vehicle of the disclosure thus mainly aims to protect a battery configured to accumulate electric power from a solar charging device.

Solution to Problem

In order to achieve the above object, the motor vehicle of the disclosure is implemented by aspects described below.

According to one aspect of the disclosure, there is provided a motor vehicle comprising: a first battery connected with a motor for driving via a first power line; a second battery configured to have a lower rated voltage than a rated voltage of the first battery; a first converter configured to step-down an electric power of the first power line and supply the stepped-down electric power to a second power line with which the second battery is connected; a third battery; a solar charging device configured to generate electric power using sunlight and supply the generated electric power to the third battery; a second converter configured to transmit electric power accompanied with a change in a voltage between the second power line and a third power line with which the third battery is connected; and a control device configured to provide permission for relief charging that is charging of the third battery using an electric power on a first power line side, when a voltage of the second battery is not lower than a predetermined voltage.

The motor vehicle of this aspect is configured to provide permission for relief charging that is charging of the third battery using the electric power on the first power line side, when the voltage of the second battery is not lower than the predetermined voltage. The "relief charging" herein denotes charging the third battery by driving the first converter and the second converter such as to supply the electric power on the first power line side to the third battery via the first converter, the second power line, the second converter and the third power line. This configuration causes relief charging to be performed in response to the permission for the relieve charging. This accordingly suppresses the voltage of the third battery from being excessively decreased and thereby protects the third battery. Furthermore, this configuration provides permission for the relief charging when the voltage of the second battery is not lower than the predetermined voltage. This also suppresses the voltage of the second battery from being excessively decreased and thereby protects the second battery.

DESCRIPTION OF EMBODIMENTS

The following describes some aspects of the disclosure with reference to embodiments.

Figure 1:
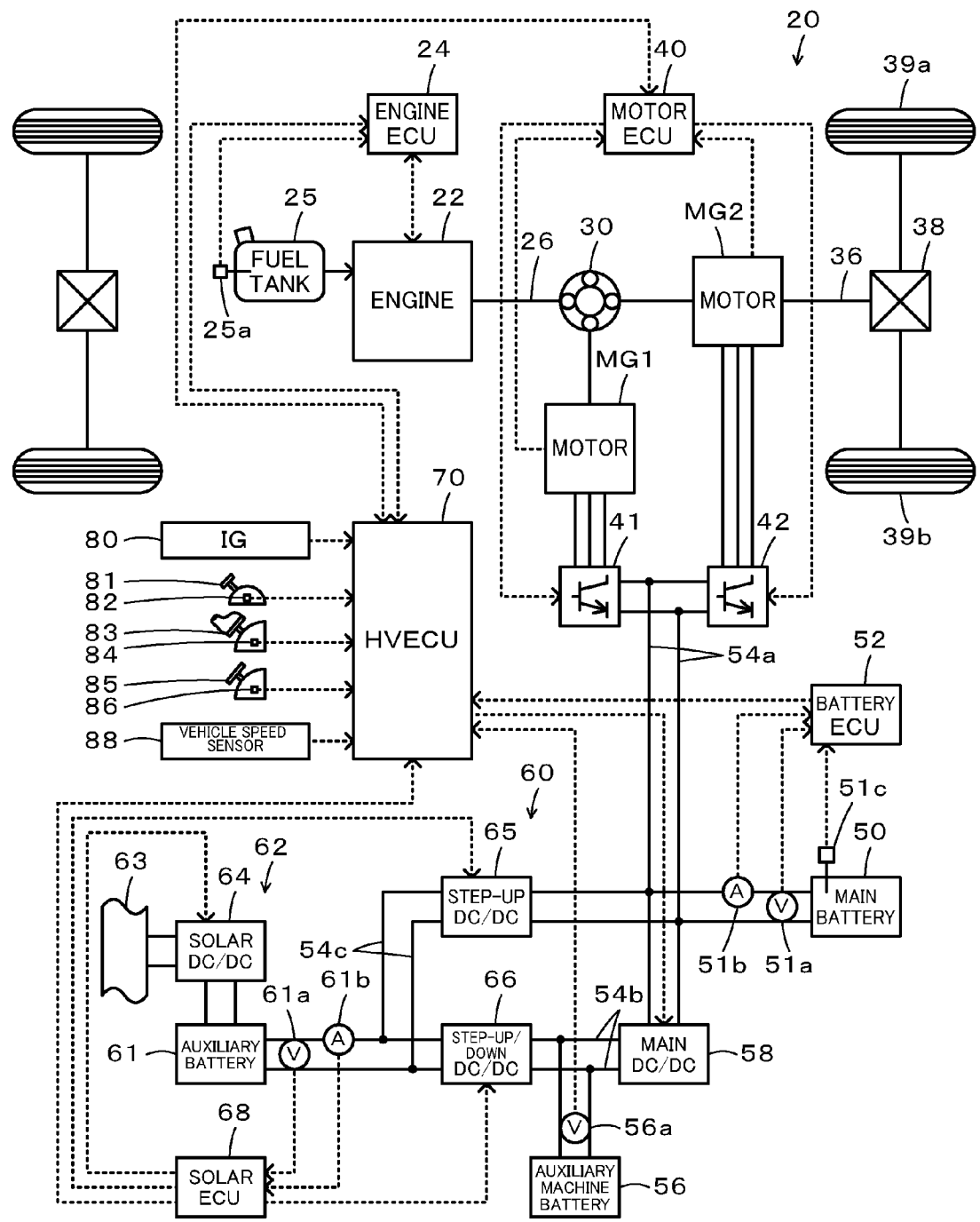
FIG. 1 is a configuration diagram illustrating the schematic configuration of a hybrid vehicle according to an embodiment of the disclosure.

FIG. 1 is a configuration diagram illustrating the schematic configuration of a hybrid vehicle 20 according to an embodiment of the disclosure. As illustrated, the hybrid vehicle 20 of the embodiment is configured to include an engine 22, a planetary gear 30, motors MG1 and MG2, inverters 41 and 42, a main battery 50, an auxiliary machine battery 56, a main DC-DC converter 58, a solar system 60 and a hybrid electronic control unit (hereinafter referred to as "HVECU") 70.

The engine 22 is configured as an internal combustion engine to output power using, for example, gasoline or light oil from a fuel tank 25 as the fuel. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. The engine ECU 24 receives signals input from various sensors required for operation control of the engine 22 via the input port, for example, a crank angle θcr from a crank position sensor configured to detect the rotational position of a crankshaft 26 of the engine 22 and a remaining amount of fuel Qol from a fuel gauge 25a mounted to the fuel tank 25. The engine ECU 24 outputs various control signals for the operation control of the engine 22 via the output port. The engine ECU 24 is connected with the HVECU 70 via the respective communication ports. The engine ECU 24 calculates a rotation speed Ne of the engine 22, based on the crank angle θcr input from the crank position sensor.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22. Accordingly the motor MG1, the engine 22 and the driveshaft 36 are connected with the sun gear, the carrier and the ring gear as three rotational elements of the planetary gear 30 such as to be arrayed in this sequence in a collinear diagram of the planetary gear 30.

The motor MG1 may be configured as, for example, a synchronous motor generator and has the rotor that is connected with the sun gear of the planetary gear 30 as described above. The motor MG2 may be configured as, for example, a synchronous motor generator and has a rotor that is connected with the driveshaft 36. The inverter 41 and the inverter 42 are respectively connected with the motor MG1 and the motor MG2 and are also connected with the main battery 50 via first power lines 54a. The motor MG1 and the motor MG2 are driven and rotated by switching control of a plurality of switching elements (not shown) included in the respective inverters 41 and 42 by a motor electronic control unit (hereinafter referred to as "motor ECU") 40.

The motor ECU 40 is configured as a CPU-based microprocessor and includes a ROM configured to store processing programs, a RAM configured to temporarily store data, input/output ports and a communication port, in addition to the CPU, although not being illustrated. The motor ECU 40 receives signals input from various sensors required for drive control of the motors MG1 and MG2 via the input port, for example, rotational positions θm1 and θm2 from rotational position detection sensors configured to detect the rotational positions of the respective rotors of the motors MG1 and MG2. The motor ECU 40 outputs, for example, switching control signals to the plurality of switching elements (not shown) included in the respective inverters 41 and 42 via the output port. The motor ECU 40 is connected with the HVECU 70 via the respective communication ports. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors.

The main battery 50 may be configured by, for example, a lithium ion rechargeable battery having a rated voltage of about 250 V, 300 V or 350 V and is connected with the inverters 41 and 42 via the first power lines 54a. This main battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. The battery ECU 52 receives signals input from various sensors required for management of the battery 50 via the input port. The signals input into the battery ECU 52 include, for example, a voltage Vmb of the main battery 50 from a voltage sensor 51a placed between terminals of the main battery 50, an electric current Imb of the main battery 50 from a current sensor 51b mounted to an output terminal of the main battery 50, and a temperature Tmb of the main battery 50 from a temperature sensor 51c mounted to the main battery 50. The battery ECU 52 is connected with the HVECU 70 via the respective communication ports. The battery ECU 52 calculates a state of charge SOCmb of the main battery 50, based on an integrated value of the electric current Imb of the main battery 50 input from the current sensor 51b, and an input limit Winmb and an output limit Woutmb of the main battery 50, based on the calculated state of charge SOCmb and the temperature Tmb of the main battery 50 from the temperature sensor 51c. The state of charge SOCmb denotes a ratio of the capacity of electric power dischargeable from the main battery 50 to the overall capacity of the main battery 50. The input limit Winmb and the output limit Woutmb denote allowable input and output powers chargeable into and dischargeable from the main battery 50.

The auxiliary machine battery 56 may be configured by, for example, a lead acid battery having a rated voltage of about 12V and is connected, along with auxiliary machines (not shown), with second power lines 54b. The main DC-DC converter 58 is connected with the first power lines 54a and the second power lines 54b and is controlled by the HVECU 70 to step-down a power of the first power lines 54a and supply the stepped-down power to the second power lines 54b.

The solar system 60 is configured to include an auxiliary battery (solar battery) 61, a solar charging device 62, a step-up DC-DC converter 65, a step-up/down DC-DC converter 66 and a solar electronic control unit (hereinafter referred to as "solar ECU") 68.

The auxiliary battery 61 may be configured by, for example, a nickel metal hydride battery having a rated voltage of about 20 V and is connected with third power lines 54c. The solar charging device 62 is configured to include a solar panel 63 and a solar DC/DC converter 64. The solar panel 63 is placed on a roof portion of the vehicle to generate electric power using the sunlight. The solar DC-DC converter 64 is controlled by the solar ECU 68 to supply the electric power generated by the solar panel 63 accompanied with a change of the voltage to the auxiliary battery 61.

The step-up DC-DC converter 65 is connected with the third power lines 54c and the first power lines 54a and is controlled by the solar ECU 68 to step-up a power of the third power lines 54c and supply the stepped-up power to the first power lines 54a. The step-up/down DC-DC converter 66 is connected with the third power lines 54c and the second power lines 54b and is controlled by the solar ECU 68 to step-down a power of the third power lines 54c and supply the stepped-down power to the second power lines 54b and to step-up a power of the second power lines 54b and supply the stepped-up power to the third power lines 54c.

The solar ECU 68 is configured as a CPU-based microprocessor and includes a ROM configured to store processing programs, a RAM configured to temporarily store data, input/output ports and a communication port, in addition to the CPU, although not being illustrated. The solar ECU 68 receives signals input from various sensors via the input port, for example, a voltage Vsb of the auxiliary battery 61 from a voltage sensor 61a placed between terminals of the auxiliary battery 61 and an electric current Isb of the auxiliary battery 61 from a current sensor 61b mounted to an output terminal of the auxiliary battery 61. The solar ECU 68 outputs controls signals to the solar DC-DC converter 64, control signals to the step-up DC-DC converter 65 and control signals to the step-up/down DC-DC converter 66 via the output port. The solar ECU 68 is connected with the HVECU 70 via the respective communication ports. The solar ECU 68 calculates a state of charge SOCsb of the auxiliary battery 61, based on an integrated value of the electric current Isb of the auxiliary battery 61 input from the current sensor 61b. The state of charge SOCsb denotes a ratio of the capacity of electric power dischargeable from the auxiliary battery 61 to the overall capacity of the auxiliary battery 61.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 receives signals input from various sensors via the input port. The signals input into the HVECU 70 include, for example, a voltage Vhb of the auxiliary machine battery 56 from a voltage sensor 56a placed between terminals of the auxiliary machine battery 56, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 outputs, for example, control signals to the main DC-DC converter 58, via the output port. The HVECU 70 is connected with the engine ECU 24, the motor ECU 40, the battery ECU 52 and the solar ECU 68 via the respective communication ports as described above.

The hybrid vehicle 20 of the embodiment having the configuration described above may be driven in an electric drive (EV drive) mode without operation of the engine 22 and in a hybrid drive (HV drive) mode with operation of the engine 22.

In the EV drive mode, the hybrid vehicle 20 is basically driven as described below. The HVECU 70 first sets a required torque Td* that is required for driving (i.e., required for the driveshaft 36), based on the accelerator position Acc and the vehicle speed V. The HVECU 70 subsequently sets a value "0" to a torque command Tm1* of the motor MG1, and sets a torque command Tm2* of the motor MG2 such that the required torque Td* is output to the driveshaft 36 within the range of the input limit Winmb and the output limit Woutmb of the main battery 50. The HVECU 70 then sends the set torque commands Tm1* and Tm2* of the motors MG1 and MG2 to the motor ECU 40. The motor ECU 40 performs switching control of the plurality of switching elements included in the respective inverters 41 and 42 such as to drive the motors MG1 and MG2 with the torque commands Tm1* and Tm2*.

In the HV drive mode, the hybrid vehicle 20 is basically driven as described below. The HVECU 70 first sets a required torque Td* that is required for driving (i.e., required for the driveshaft 36), based on the accelerator position Acc and the vehicle speed V, and sets a required power Pd* that is required for driving by multiplying the set required torque Td* by a rotation speed Nd of the driveshaft 36 (rotation speed Nm2 of the motor MG2). The HVECU 70 subsequently sets a required power Pe* that is required for the vehicle (i.e., required for the engine 22) by subtracting a required charge-discharge power Pb* of the main battery 50 (which takes a positive value when the main battery 50 is discharged) based on the state of charge SOCmb from the required power Pd*. The HVECU 70 sets a target rotation speed Ne* and a target torque Te* of the engine 22 and torque commands Tm1* and Tm2* of the motors MG1 and MG2 such that the required power Pe* is output from the engine 22 and that the required torque Td* is output to the driveshaft 36 within the range of the input limit Winmb and the output limit Woutmb of the main battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. The engine ECU 24 performs, for example, intake air flow control, fuel injection control and ignition control of the engine 22 such as to operate the engine 22 with the target rotation speed Ne* and the target torque Te*. The motor ECU 40 performs switching control of the plurality of switching elements included in the respective inverters 41 and 42 such as to drive the motors MG1 and MG2 with the torque commands Tm1* and Tm2*.

Figure 2:
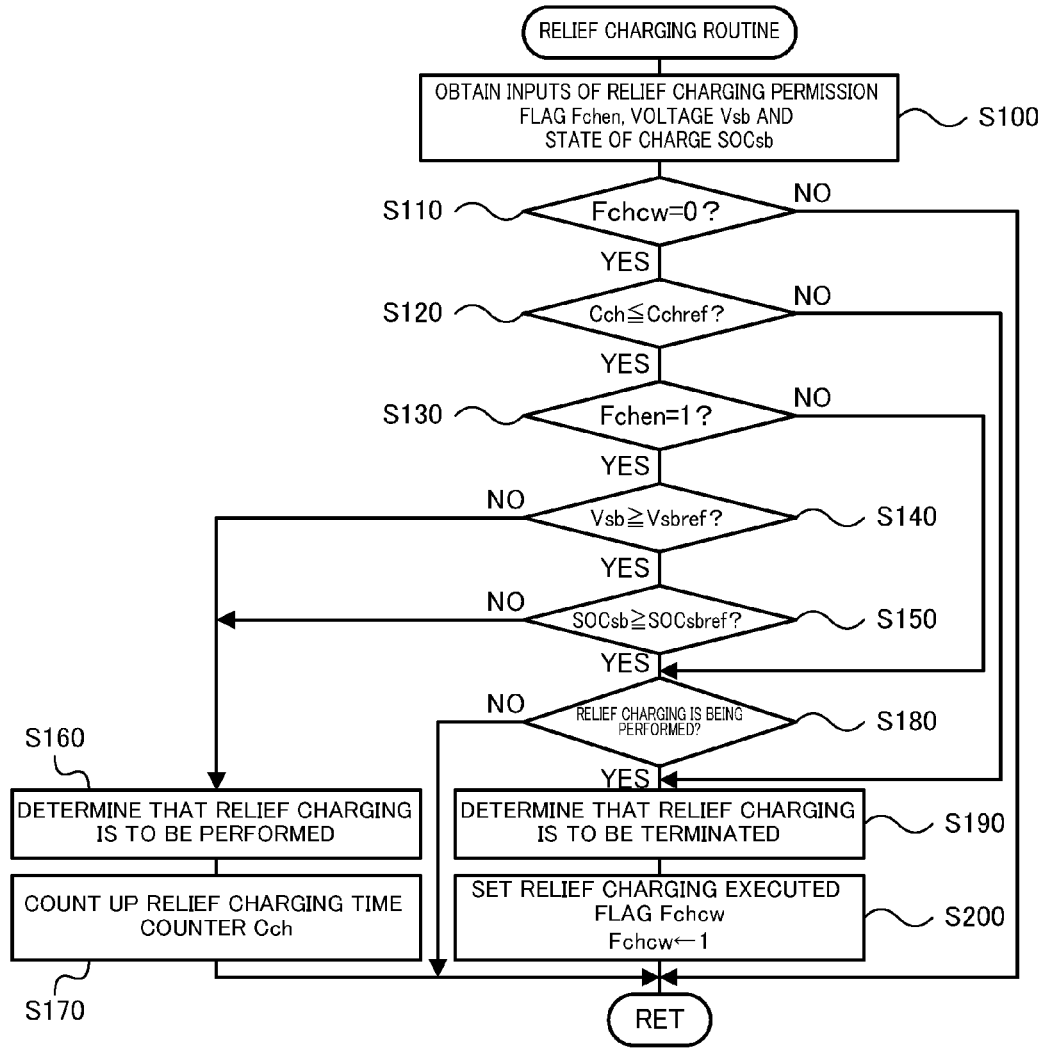
FIG. 2 is a diagram illustrating one example of a relief charging routine performed by a solar ECU according to the embodiment.

The following describes operations of the hybrid vehicle 20 of the embodiment having the above configuration and more specifically series of operations with regard to relief charging of the auxiliary battery 61. The relief charging of the auxiliary battery 61 denotes charging the auxiliary battery 61 using an electric power on the first power lines 54a-side (i.e., electric power of the main battery 50 and electric power generated by the motor MG1 using power output from the engine 22). FIG. 2 is a diagram illustrating one example of a relief charging routine performed by the solar ECU 68 according to the embodiment. This routine is repeatedly performed during a trip (i.e., a time period between an ON operation and an OFF operation of the ignition switch 80).

When the relief charging routine is triggered, the solar ECU 68 first obtains input data, for example, the voltage Vsb and the state of charge SOCsb of the auxiliary battery 61 and a relief charging permission flag Fchen (step S100). The voltage Vsb of the auxiliary battery 61 input here is a value detected by the voltage sensor 61a. The state of charge SOCsb of the auxiliary battery 61 input here is a calculated value based on the electric current Isb of the auxiliary battery 61 input from the current sensor 61b. The relief charging permission flag Fchen is set to a value 1 when permission is provided for relief charging of the auxiliary battery 61 and is set to a value 0 when no permission is provided for relief charging of the auxiliary battery 61 by a relief charging permission flag setting routine (described later) performed by the HVECU 70, and is input here by communication.

After the data input, the solar ECU 68 checks the setting of a relief charging executed flag Fchcw (step S110). The relief charging executed flag Fchcw is a flag indicating whether relief charging of the auxiliary battery 61 has been performed during a current trip. This relief charging executed flag Fchcw is set to a value 0 as an initial value when the ignition switch 80 is turned on and is set to a value 1 by the processing of step S200 (described later) when relief charging of the auxiliary battery 61 has been performed.

When the relief charging executed flag Fchcw is equal to the value 0 at step S110, the solar ECU 68 determines that relief charging of the auxiliary battery 61 has not been performed yet during the current trip and subsequently compares a relief charging time counter Cch with a reference value Chref (step S120). The relief charging time counter Cch denotes a counter indicating an execution time of relief charging of the auxiliary battery 61. This relief charging time counter Cch is set to a value 0 as an initial value when the ignition switch 80 is turned on and is counted up by one by the processing of step S170 (described later) every time relief charging of the auxiliary battery 61 is performed. The reference value Cchref denotes an allowable time period for relief charging of the auxiliary battery 61 and may be a value corresponding to, for example, 50 minutes, 60 minutes or 70 minutes.

When the relief charging time counter Cch is equal to or less than the reference value Cchref at step S120, the solar ECU 68 determines that the execution time of relief charging of the auxiliary battery 61 is equal to or shorter than the allowable time period (including the value 0) and subsequently checks the setting of the relief charging permission flag Fchen (step S130). When the relief charging permission flag Fchen is equal to the value 1, the solar ECU 68 determines that permission is provided for relief charging of the auxiliary battery 61. The solar ECU 68 subsequently compares the voltage Vsb of the auxiliary battery 61 with a reference value Vsbref (step S140) and also compares the state of charge SOCsb of the auxiliary battery 61 with a reference value SOCsbref (step S150).

The reference value Vsbref and the reference value SOCsbref used here are threshold values used to determine whether there is a requirement for relief charging of the auxiliary battery 61. The reference value Vsbref may be, for example, a value somewhat lower than the rated voltage of the auxiliary battery 61. The reference value SOCsbref may be, for example, a value somewhat higher than an allowable lower limit rate of the auxiliary battery 61. When the voltage Vsb of the auxiliary battery 61 is lower than the reference value Vsbref or when the state of charge SOCsb of the auxiliary battery 61 is lower than the reference value SOCsbref, it is expected that power generation is not sufficiently performed by the solar charging device 62 for a certain time period, for example, the hybrid vehicle 20 is parked in an indoor parking space for a certain time period. It is accordingly expected that no sufficient electric power is supplied from the solar charging device 62 to the auxiliary battery 61 (i.e., the auxiliary battery 61 is not sufficiently charged). Additionally, the auxiliary battery 61 is configured by the nickel metal hydride battery. The nickel metal hydride battery is likely to decrease the voltage Vsb and reduce the state of charge SOCsb by self-discharge, compared with a lithium ion rechargeable battery. According to the embodiment, on the basis of these possibilities, the solar ECU 68 uses the voltage Vsb and the state of charge SOCsb of the auxiliary battery 61 to determine whether there is a requirement for relief charging of the auxiliary battery 61.

When the voltage Vsb of the auxiliary battery 61 is lower than the reference value Vsbref at step S140 or when the state of charge SOCsb of the auxiliary battery 61 is lower than the reference value SOCsbref at step S150, the solar ECU 68 determines that there is a requirement for relief charging of the auxiliary battery 61 and subsequently determines that relief charging of the auxiliary battery 61 is to be performed (step S160). The solar ECU 68 then counts up the relief charging time counter Cch by one (step S170) and terminates this routine.

On determination that relief charging of the auxiliary battery 61 is to be performed, the solar ECU 68 sends an execution command for relief charging to the HVECU 70 and controls the step-up/down DC-DC converter 66 such as to supply the power of the second power lines 54b to the third power lines 54c. When receiving the execution command for relief charging, the HVECU 70 controls the main DC-DC converter 58 such as to supply the electric power of the first power lines 54a to the second power lines 54b. Such control of the main DC-DC converter 58 and the step-up/down DC-DC converter 66 causes the electric power on the first power lines 54a-side (i.e., the electric power from the main battery 50 and the electric power generated by the motor MG1) to the auxiliary battery 61 via the main DC-DC converter 58, the second power lines 54b, the step-up/down DC-DC converter 66 and the third power lines 54c and performs relief charging of the auxiliary battery 61.

When the relief charging permission flag Fchen is equal to the value 0 at step S130, the solar ECU 68 determines that no permission is provided for relief charging of the auxiliary battery 61 and subsequently determines whether relief charging of the auxiliary battery 61 is being performed (step S180). When the relief charging permission flag Fchen is equal to the value 1 and it is determined that the voltage Vsb of the auxiliary battery 61 is equal to or higher than the reference value Vsbref at step S140 and that the state of charge SOCsb of the auxiliary battery 61 is equal to or higher than the reference value SOCsbref, the solar ECU 68 determines that there is no requirement for relief charging of the auxiliary battery 61 and subsequently determines whether relief charging of the auxiliary battery 61 is being performed (step S180).

When it is determined at step S180 that relief charging of the auxiliary battery 61 is not being performed, the solar ECU 68 terminates this routine.

When it is determined at step S180 that relief charging of the auxiliary battery 61 is being performed, the solar ECU 68 determines that relief charging of the auxiliary battery 61 is to be terminated (step S190). The solar ECU 68 then sets the relief charging executed flag Fchcw to the value 1 (step S200) and terminates this routine. On determination that relief charging of the auxiliary battery 61 is to be terminated, the solar ECU 68 sends a termination command for relief charging to the HVECU 70 and stops operation of the step-up/down DC-DC converter 66. When receiving the termination command for relief charging, the HVECU 70 controls the DC-DC converter 58 such as to supply the electric power from the first power lines 54a to the second power lines 54b and stops operation of the main DC-DC converter 58, based on the voltage Vhb of the auxiliary machine battery 56 (i.e., voltage of the second power lines 54b) and power consumption of the auxiliary machines (not shown) connected with the second power lines 54b.

When the relief charging time counter Cch is greater than the reference value Cchref at step S120, the solar ECU 68 determines that the execution time of relief charging of the auxiliary battery 61 exceeds the allowable time period and determines that relief charging of the auxiliary battery 61 is to be terminated (step S190). The solar ECU 68 then sets the relief charging executed flag Fchcw to the value 1 (step S200) and terminates this routine.

When the relief charging executed flag Fchcw is set to the value 1, it is determined at step S110 that the relief charging executed flag Fchcw is equal to the value 1 in a subsequent cycle of this routine during the current trip. The solar ECU 68 then determines that relief charging of the auxiliary battery 61 has already been performed during the current trip and terminates this routine.

Figure 3:
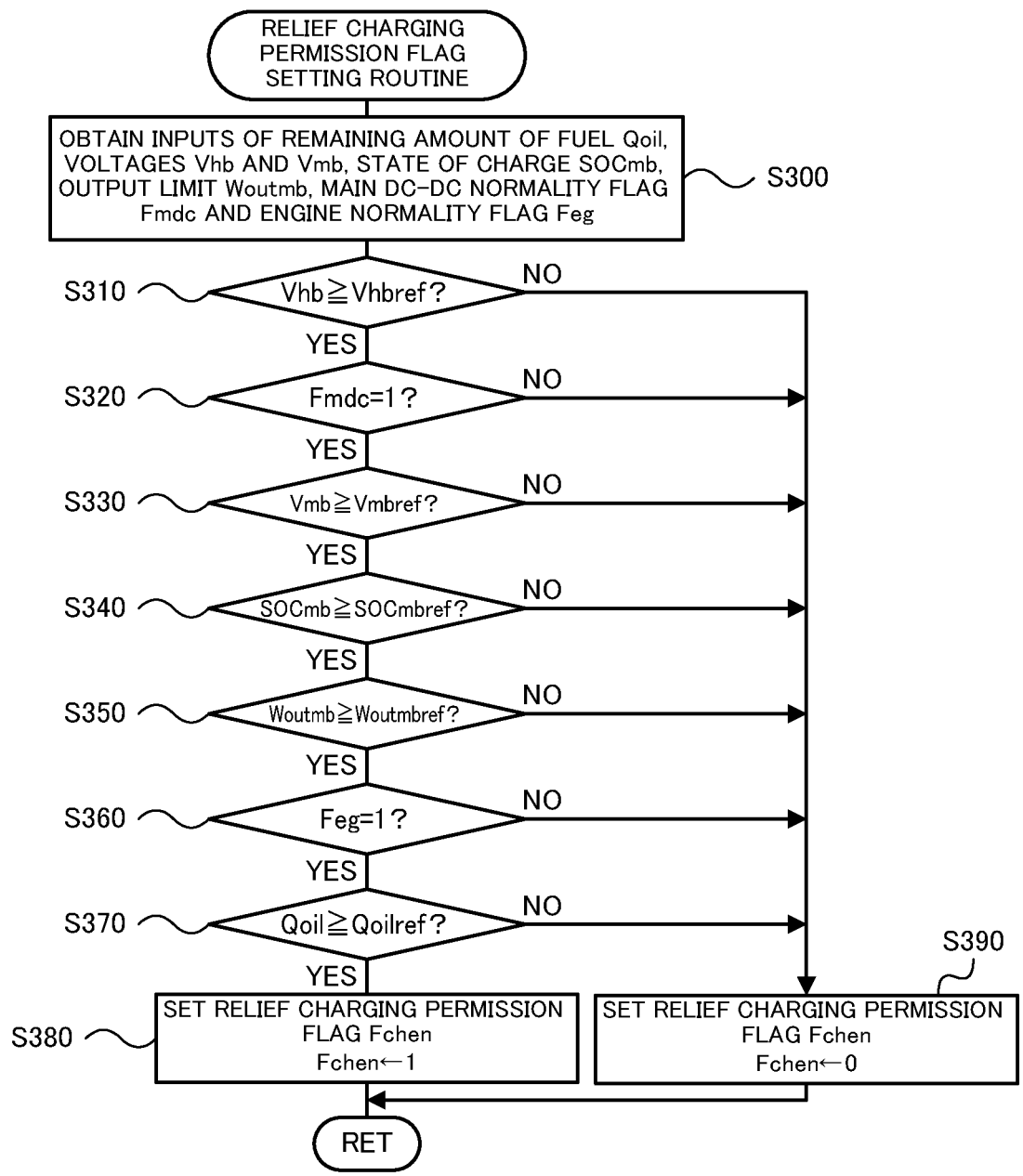
FIG. 3 is a diagram illustrating one example of a relief charging permission flag setting routine performed by an HVECU according to the embodiment.

The following describes a process of setting the relief charging permission flag Fchen that is used in the relief charging routine of FIG. 2. FIG. 3 is a diagram illustrating one example of a relief charging permission flag setting routine performed by the HVECU 70 according to the embodiment. This routine is performed repeatedly during a trip.

When the relief charging permission flag setting routine is triggered, the HVECU 70 first obtains input data, for example, the remaining amount of fuel Qoil, the voltage Vhb of the auxiliary machine battery 56, the voltage Vmb, the state of charge SOCmb and the output limit Woutmb of the main battery 50, a main DC-DC normality flag Fmdc and an engine normality flag Feg (step S300).

The remaining amount of fuel Qoil is a value detected by the fuel gauge 25a and is input here by the engine ECU 24 by communication. The voltage Vhb of the auxiliary machine battery 56 input here is a value detected by the voltage sensor 56a. The voltage Vmb of the main battery 50 is a value detected by the voltage sensor 51a and is input by the battery ECU 52 by communication. The state of charge SOCmb of the main battery 50 is a calculated value based on the electric current Imb of the main battery 50 from the current sensor 51b and is input here by the battery ECU 52 by communication. The output limit Woutmb of the main battery 50 is a calculated value based on the state of charge SOCmb of the main battery 50 and the temperature Tmb from the temperature sensor 51c and is input here by the battery ECU 52 by communication.

The main DC-DC normality flag Fmdc input here is set to a value 1 when the main DC-DC converter 58 is normal and is set to a value 0 when the DC-DC converter 58 is not normal (i.e., when the DC-DC converter 58 is abnormal) by the HVECU 70. It is determined that the main DC-DC converter 58 is not normal, for example, when the temperature of the main DC-DC converter 58 exceeds an allowable temperature. The engine normality flag Feg is set to a value 1 when the engine 22 is normal and is set to a value 0 when the engine 22 is not normal (i.e., when the engine 22 is abnormal) by the engine ECU 24, and is input here by communication. It is determined that the engine 22 is not normal, for example, when the temperature of the engine 22 exceeds an allowable temperature.

After the data input, the HVECU 70 compares the input voltage Vhb of the auxiliary machine battery 56 with a reference value Vhbref (step S310). The reference value Vhbref is a threshold value used to determine whether the voltage Vhb of the auxiliary machine battery 56 is within a normal range and may be, for example, a value lower by several volts (V) than the rated voltage of the auxiliary machine battery 56. When the voltage Vhb of the auxiliary machine battery 56 is lower than the reference value Vhbref, the HVECU 70 determines that the voltage Vhb of the auxiliary machine battery 56 is not within the normal range. The HVECU 70 then sets the relief charging permission flag Fchen to the value 0 (step S390) and terminates this routine.

When the voltage Vhb of the auxiliary machine battery 56 is equal to or higher than the reference value Vhbref at step S310, the HVECU 70 determines that the voltage Vhb of the auxiliary machine battery 56 is within the normal range and checks the setting of the main DC-DC normality flag Fmdc (step S320). When the main DC-DC normality flag is equal to the value 0, the HVECU 70 determines that the main DC-DC converter 58 is not normal (i.e., the main DC-DC converter 58 is abnormal), sets the relief charging permission flag Fchen to the value 0 (step S390) and terminates this routine.

When the main DC-DC normality flag Fmdc is equal to the value 1 at step S320, the HVECU 70 determines that the main DC-DC converter 58 is normal. The HVECU 70 subsequently compares the voltage Vmb of the main battery 50 with a reference value Vmbref (step S330), also compares the state of charge SOCmb of the main battery 50 with a reference value SOCmbref (step S340) and further compares the output limit Woutmb of the main battery 50 with a reference value Woutmbref (step S350). The reference value Vmbref, the reference value SOCmbref and the reference value Woutmbref are threshold values used to determine whether output of a certain amount of electric power from the main battery 50 is allowed for relief charging of the auxiliary battery 61. The reference value Vmbref may be, for example, a value somewhat lower than the rated voltage of the main battery 50. The reference value SOCmbref may be, for example, a value somewhat higher than an allowable lower limit rate of the main battery 50. The reference value Woutmbref may be, for example, a value somewhat smaller than a rated output of the main battery 50.

When the voltage Vmb of the main battery 50 is lower than the reference value Vmbref at step S330, when the state of charge SOCmb of the main battery 50 is lower than the reference value SOCmbref at step S340 or when the output limit Woutmb of the main battery 50 is smaller than the reference value Woutmbref at step S350, the HVECU 70 determines that output of a certain amount of electric power from the main battery 50 is not allowed for relief charging of the auxiliary battery 61. The HVECU 70 then sets the relief charging permission flag Fchen to the value 0 (step S390) and terminates this routine.

When the voltage Vmb of the main battery 50 is equal to or higher than the reference value Vmbref at step S330, the state of charge SOCmb of the main battery 50 is equal to or higher than the reference value SOCmbref at step S340 and the output limit Woutmb of the main battery 50 is equal to or larger than the reference value Woutmbref at step S350, the HVECU 70 determines that output of a certain amount of electric power from the main battery 50 is allowed for relief charging of the auxiliary battery 61 and subsequently checks the setting of the engine normality flag Feg (step S360). When the engine normality flag Feg is equal to the value 0, the HVECU 70 determines that the engine 22 is not normal (i.e., the engine 22 is abnormal). The HVECU 70 then sets the relief charging permission flag Fchen to the value 0 (step S390) and terminates this routine.

When the engine normality flag Feg is equal to the value 1 at step S360, the HVECU 70 determines that the engine 22 is normal and subsequently compares the remaining amount of fuel Qoil with a reference value Qoilref (step S370). The reference value Qoilref is a threshold value used to determine whether a certain amount of electric power is suppliable to the main battery 50 (i.e., to the first power lines 54a) by power generation of the motor MG1 and may be, for example, several liters.

When the remaining amount of fuel Qoil is less than the reference value Qoilref at step S370, the HVECU 70 determines that a certain amount of electric power is not suppliable to the main battery 50 (i.e., to the first power lines 54a) by power generation of the motor MG1. The HVECU 70 then sets the relief charging permission flag Fchen to the value 0 (step S390) and terminates this routine.

When the remaining amount of fuel Qoil is equal to or greater than the reference value Qoilref at step S370, the HVECU 70 determines that a certain amount of electric power is suppliable to the main battery 50 (i.e., to the first power lines 54a) by power generation of the motor MG1. The HVECU 70 then sets the relief charging permission flag Fchen to the value 1 (step S380) and terminates this routine.

The condition that the voltage Vhb of the auxiliary machine battery 56 is equal to or higher than the reference value Vhbref (i.e., the condition that the voltage Vhb is within the normal range) is used as one of the conditions to set the relief charging permission flag Fchen to the value 1 (i.e., to provide permission for relief charging of the auxiliary battery 61). This suppresses the voltage Vhb of the auxiliary machine battery 56 from being excessively decreased when relief charging of the auxiliary battery 61 is performed (i.e., suppresses the auxiliary machine battery 56 from being over-discharged). This configuration accordingly enables relief charging of the sub-batter 61 to be performed, while protecting the auxiliary machine battery 56.

The hybrid vehicle 20 of the embodiment described above is configured to control the main DC-DC converter 58 and the step-up/down DC-DC converter 66 such as to supply the electric power on the first power lines 54a-side (i.e., the electric power of the main battery 50 and the electric power generated by the motor MG1 using the power output from the engine 22) to the auxiliary battery 61 via the main DC-DC converter 58, the second power lines 54b, the step-up/down DC-DC converter 66 and the third power lines 54c, when the relief charging permission flag Fchen is equal to the value 1. This enables relief charging of the auxiliary battery 61 to be performed. Additionally, the condition that the voltage Vhb of the auxiliary machine battery 56 is equal to or higher than the reference value Vhbref is used as one of the conditions to set the relief charging permission flag Fchen to the value 1. This suppresses the voltage Vhb of the auxiliary machine battery 56 from being excessively decreased when relief charging of the auxiliary battery 61 is performed (i.e., suppresses the auxiliary machine battery 56 from being over-discharged). This configuration accordingly protects the auxiliary machine battery 56.

The hybrid vehicle 20 of the embodiment is configured to use the relief charging permission flag Fchen and perform relief charging of the auxiliary battery 61 only once during one trip. A modification may be configured not to use the relief charging permission flag Fchen (i.e., may be configured not to perform the processing of steps S100 and S200 in the relief charging routine of FIG. 2, and the frequency of relief charging of the auxiliary battery 61 may not be necessarily limited to only once during one trip.

The hybrid vehicle 20 of the embodiment is configured to use the condition that the relief charging time counter Cch is greater than the reference value Cchref, the condition that the relief charging permission flag Fchen is equal to the value 0, and the condition that the voltage Vsb of the auxiliary battery 61 is equal to or higher than the reference value Vsbref and the state of charge SOCsb of the auxiliary battery 61 is equal to or higher than the reference value SOCsbref, as the condition to terminate relief charging of the auxiliary battery 61. According to a modification, only part of these conditions may be used as the condition to terminate relief charging of the auxiliary battery 61.

The hybrid vehicle 20 of the embodiments is configured to set the relief charging permission flag Fchen by using the voltage Vhb of the auxiliary machine battery 56, the main DC-DC normality flag Fmdc, the voltage Vmb, the state of charge SOCmb and the output limit Woutmb of the main battery 50, the engine normality flag Feg and the remaining amount of fuel Qoil. It is, however, only necessary to set the relief charging permission flag Fchen by using at least the voltage Vhb of the auxiliary machine battery 56. In other words, the relief charging permission flag Fchen may be set without using at least part of the main DC-DC normality flag Fmdc, the voltage Vmb, the state of charge SOCmb and the output limit Woutmb of the main battery 50, the engine normality flag Feg and the remaining amount of fuel Qoil. For example, when relief charging of the auxiliary battery 61 is executable by not using the electric power generated by the motor MG1 but by using only the electric power from the main battery 50 (i.e., when relief charging of the auxiliary battery 61 is executable in the EV drive mode), the relief charging permission flag Fchen may be set without using the engine normality flag Feg and the remaining amount of fuel Qoil. In another example, when relief charging of the auxiliary battery 61 is executable by not using the electric power from the main battery 50 but by using only the electric power generated by the motor MG1 (i.e., when the electric power required for relief charging of the auxiliary battery 61 can be covered by only the electric power generated by the motor MG1), the relief charging permission flag Fchen may be set without using the voltage Vmb, the state of charge SOCmb and the output limit Woutmb of the main battery 50.

The hybrid vehicle 20 of the embodiment is configured to set the relief charging permission flag Fchen to the value (i.e., is configured not to provide permission to relief charging of the auxiliary battery 61), when the main DC-DC normality flag Fmdc is equal to the value 0 or when the engine normality flag Feg is equal to the value 0 (i.e., when the main DC-DC converter 58 is not normal or when the engine 22 is not normal). According to a modification, the relief charging permission flag Fchen may be set to the value 0, when a component or a system other than the main DC-DC converter 58 and the engine 22 is not normal, for example, when the step-up/down DC-DC converter 66 is not normal or when communication between the solar ECU 68 and the HVECU 70 is not normal.

In the hybrid vehicle 20 of the embodiment, the auxiliary battery 61 is configured by the nickel metal hydride battery. According to a modification, the auxiliary battery 61 may be configured by a secondary battery other than the nickel metal hydride battery, for example, a lithium ion rechargeable battery.

The hybrid vehicle 20 of the embodiment is configured to include the engine ECU 24, the motor ECU 40, the battery ECU 52, the solar ECU 68 and the HVECU 70. According to a modification, at least two of the engine ECU 24, the motor ECU 40, the battery ECU 52, the solar ECU 68 and the HVECU 70 (for example, the solar ECU 68 and the HVECU 70) may be configured by a single electronic control unit.

Figure 4:
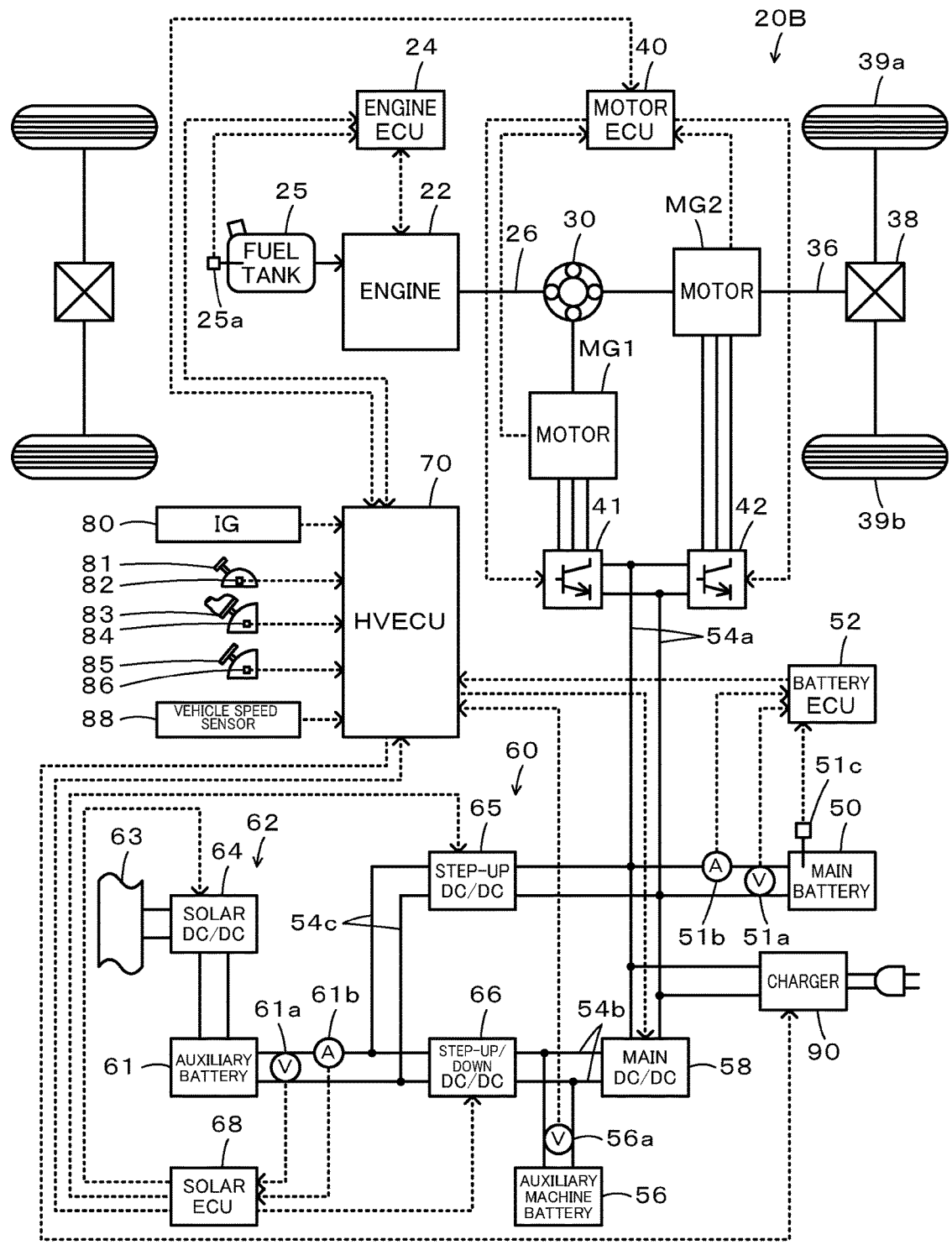
FIG. 4 is a configuration diagram illustrating the schematic configuration of a hybrid vehicle according to a modification.

The hybrid vehicle 20 of the embodiment has the hardware configuration that includes the main battery 50, the auxiliary machine battery 56, the main DC-DC converter 58, the solar system 60 and the like. As shown in FIG. 4, a hybrid vehicle 20B of a modification may have a hardware configuration that further includes a charger 90 used to charge the main battery 50 with electric power from an external power source, in addition to the main battery 50, the auxiliary machine battery 56, the main DC-DC converter 58, the solar system 60 and the like. The charger 90 is connected with the first power lines 54a. The charger 90 that is connected with an external power source is controlled by the HVECU 70 such as to supply electric power from the external power source to the first power lines 54a (i.e., to the main battery 50). In this modified hardware configuration, the relief charging routine of FIG. 2 and the relief charging permission flag setting routine of FIG. 3 may be performed not only during a trip but during connection of the charger 90 with the external power source. When relief charging of the auxiliary battery 61 is performed during connection of the charger 90 with the external power source, the electric power from the main battery 50 and the electric power from the external power source are used as the electric power on the first power lines 54a-side.

Figure 5:
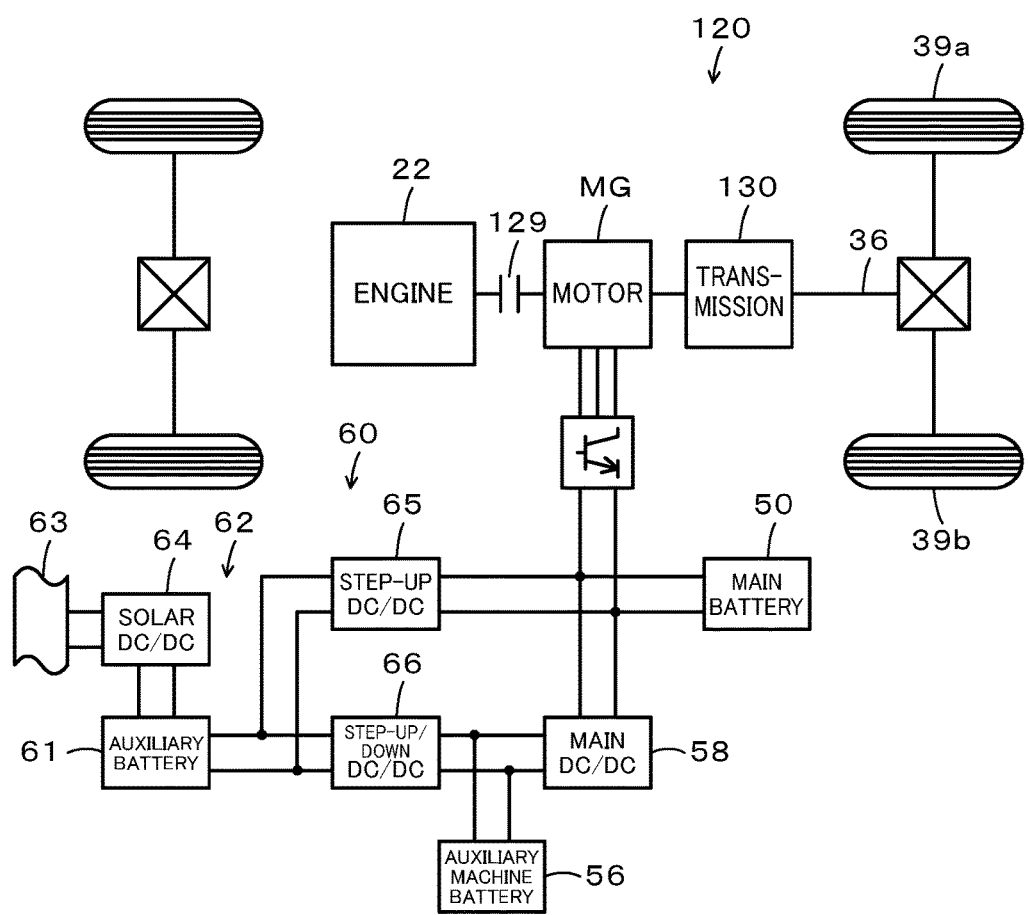
FIG. 5 is a configuration diagram illustrating the schematic configuration of a hybrid vehicle according to another modification.
Figure 6:
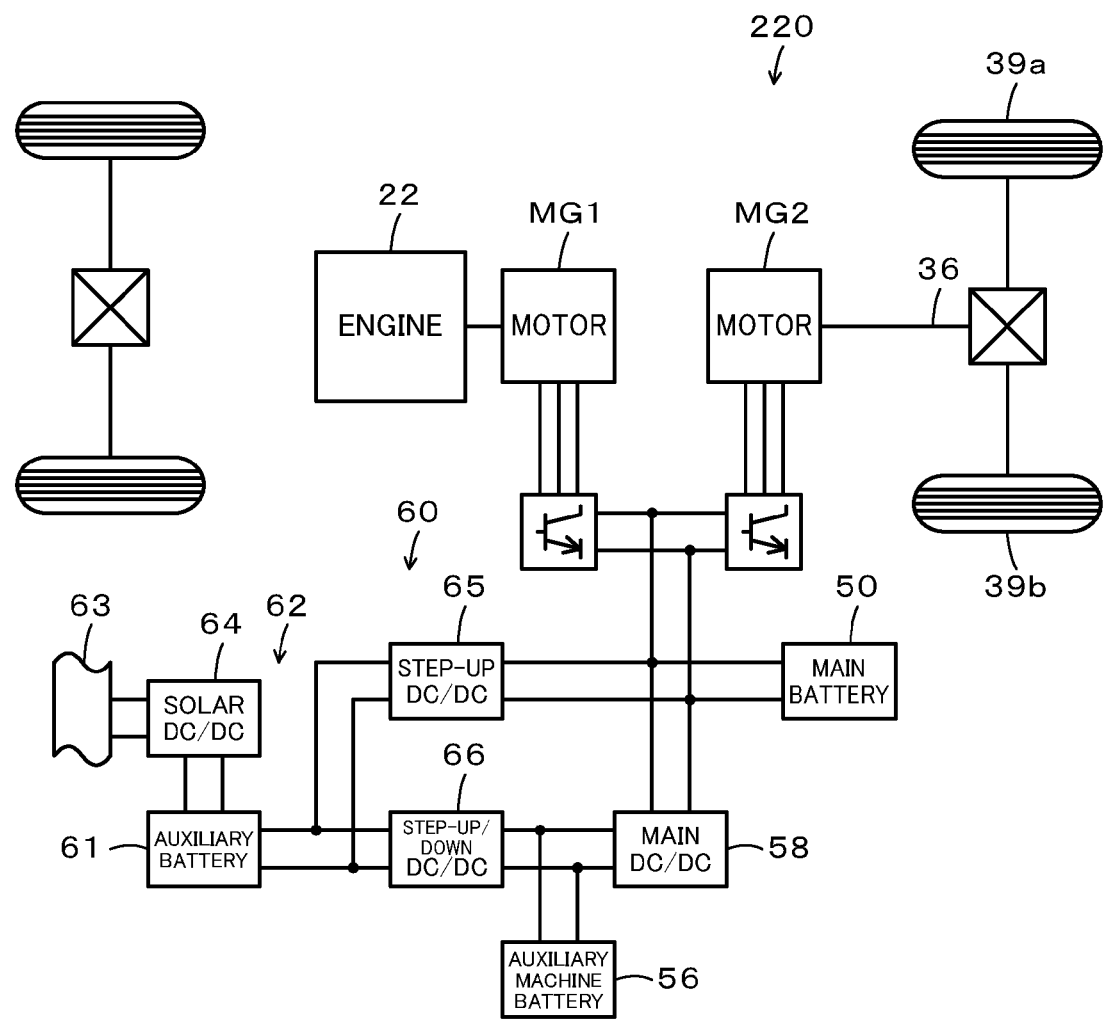
FIG. 6 is a configuration diagram illustrating the schematic configuration of a hybrid vehicle according to another modification.
Figure 7:
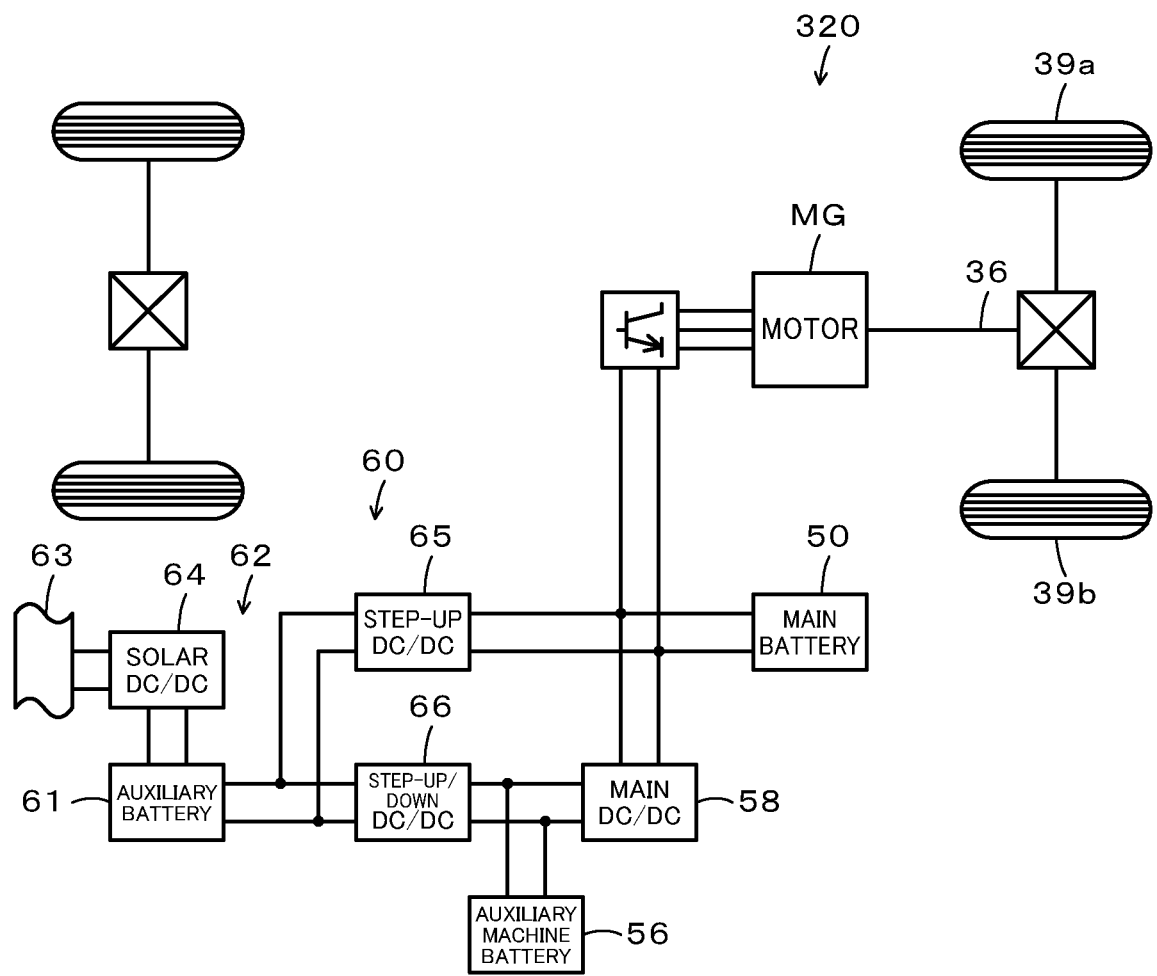
FIG. 7 is a configuration diagram illustrating the schematic configuration of an electric vehicle according to another modification.

In the hybrid vehicle 20 of the embodiment configured to include the main battery 50, the auxiliary machine battery 56, the main DC-DC converter 58, the solar system 60 and the like, the engine 22 and the motor MG1 are connected via the planetary gear 30 with the driveshaft 36 that is coupled with the drive wheels 39a and 39b, and the motor MG2 is connected with the driveshaft 36. As shown in FIG. 5, in a hybrid vehicle 120 of a modification configured to include the main battery 50, the auxiliary machine battery 56, the main DC-DC converter 58, the solar system 60 and the like, a motor MG may be connected via a transmission 130 with a driveshaft 36 that is coupled with drive wheels 39a and 39b, and an engine 22 may be connected via a clutch 129 with a rotating shaft of the motor MG. As shown in FIG. 6, in a hybrid vehicle 220 of another modification configured to include the main battery 50, the auxiliary machine battery 56, the main DC-DC converter 58, the solar system 60 and the like, a motor MG2 for driving may be connected with a driveshaft 36 that is coupled with drive wheels 39a and 39b, and a motor MG1 for power generation may be connected with an output shaft of an engine 22. Additionally, as shown in FIG. 7, in an electric vehicle 320 of another modification configured to include the main battery 50, the auxiliary machine battery 56, the main DC-DC converter 58, the solar system 60 and the like, a motor MG for driving may be connected with a driveshaft 36 that is coupled with drive wheels 39a and 39b.

In the motor vehicle of the above aspect, when the permission is provided for the relief charging and it is determined that there is a requirement for execution of the relief charging, based on at least one of a voltage and a state of charge of the third battery, the control device may be configured to control the first converter such as to supply the electric power of the first power line to the second power line and to control the second converter such as to supply an electric power of the second power line to the third power line. When the permission is provided for the relief charging and there is a requirement for execution of the relief charging, this configuration drives the first converter and the second converter to perform the relief charging.

In the motor vehicle of the above aspect, the third battery may be configured by a nickel metal hydride battery. The nickel metal hydride battery is likely to decrease the voltage and reduce the state of charge by self-discharge, compared with the lithium ion rechargeable battery or the like. The relief charging of the nickel metal hydride battery is accordingly of greater significance.

In the motor vehicle of the above aspect, the electric power on the first power line side used for the relief charging may be an electric power including an electric power of the first battery, and the control device may be configured to provide permission for the relief charging, when the voltage of the second battery is not lower than the predetermined voltage and it is determined that the relief charging is executable using the electric power of the first battery, based on at least one of a voltage, a state of charge and an allowable output power of the first battery. This configuration enables the relief charging to be performed using at least the electric power of the first battery.

The motor vehicle of the above aspect may further comprise: an engine configured to output a power using a fuel from a fuel tank; and a generator connected with the first power line and configured to generate electric power using the power output from the engine, wherein the electric power on the first power line side used for the relief charging may be an electric power including the electric power generated by the generator, and the control device may be configured to provide permission for the relief charging, when the voltage of the second battery is not lower than the predetermined voltage and a remaining amount of the fuel in the fuel tank is not less than a predetermined remaining amount. This configuration enables the relief charging to be performed using at least the electric power generated by the generator.

The motor vehicle of the above aspect may further comprise a charger configured to charge the first battery via the first power line using an electric power from an external power source, wherein the electric power on the first power line side used for the relief charging may be an electric power including the electric power from the charger, and the control device may be configured to provide permission for the relief charging, when the voltage of the second battery is not lower than the predetermined voltage and the charger is connected with the external power source. This configuration enables the relief charging to be performed using at least the electric power of the external power source (charger).

The following describes the correspondence relationship between the primary elements of this embodiment and the primary elements of the disclosure described in Summary. The main battery 50 of the embodiment corresponds to the "first battery", and the auxiliary machine battery 56 corresponds to the "second battery". The main DC-DC converter 58 corresponds to the "first converter", and the auxiliary battery 61 corresponds to the "third battery". The solar charging device 62 corresponds to the "solar charging device", and the step-up/down DC-DC converter 66 corresponds to the "second converter". The solar ECU 68 and the HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The present disclosure is applicable to, for example, the manufacturing industry of motor vehicles.

The invention claimed is:

1. A motor vehicle, comprising:
a first battery connected with a motor for driving via a first power line;
a second battery configured to have a lower rated voltage than a rated voltage of the first battery;
a first converter configured to step-down an electric power of the first power line and supply the stepped-down electric power to a second power line with which the second battery is connected;
a third battery;
a solar charging device configured to generate electric power using sunlight and supply the generated electric power to the third battery;
a second converter configured to transmit electric power accompanied with a change in a voltage between the second power line and a third power line with which the third battery is connected; and
a control device configured to provide permission for relief charging that is charging of the third battery using an electric power on a first power line side, when a voltage of the second battery is not lower than a predetermined voltage.

2. The motor vehicle according to claim 1, wherein when the permission is provided for the relief charging and it is determined that there is a requirement for execution of the relief charging, based on at least one of a voltage and a state of charge of the third battery, the control device is configured to control the first converter such as to supply the electric power of the first power line to the second power line and to control the second converter such as to supply an electric power of the second power line to the third power line.

3. The motor vehicle according to claim 1, wherein the third battery is configured by a nickel metal hydride battery.

4. The motor vehicle according to claim 1, wherein the electric power on the first power line side used for the relief charging is an electric power including an electric power of the first battery, and
the control device is configured to provide permission for the relief charging, when the voltage of the second battery is not lower than the predetermined voltage and it is determined that the relief charging is executable using the electric power of the first battery, based on at least one of a voltage, a state of charge and an allowable output power of the first battery.

5. The motor vehicle according to claim 1, further comprising:
an engine configured to output a power using a fuel from a fuel tank; and
a generator connected with the first power line and configured to generate electric power using the power output from the engine, wherein
the electric power on the first power line side used for the relief charging is an electric power including the electric power generated by the generator, and
the control device is configured to provide permission for the relief charging, when the voltage of the second battery is not lower than the predetermined voltage and a remaining amount of the fuel in the fuel tank is not less than a predetermined remaining amount.

6. The motor vehicle according to claim 1, further comprising:
a charger configured to charge the first battery via the first power line using an electric power from an external power source, wherein
the electric power on the first power line side used for the relief charging is an electric power including the electric power from the charger, and
the control device is configured to provide permission for the relief charging, when the voltage of the second battery is not lower than the predetermined voltage and the charger is connected with the external power source.

* * * * *